March 2, 1965  R. E. WEBBER  3,171,673
VARIABLE LEVEL HITCH DEVICE
Filed May 14, 1962  2 Sheets-Sheet 1
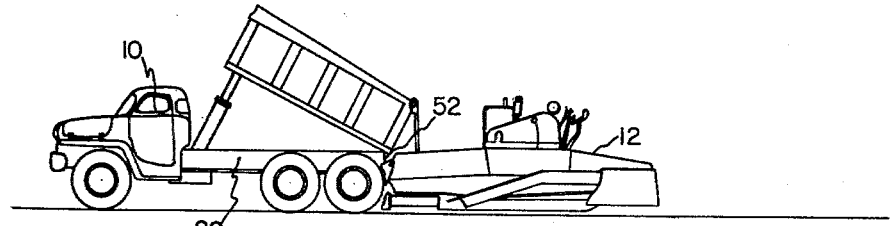
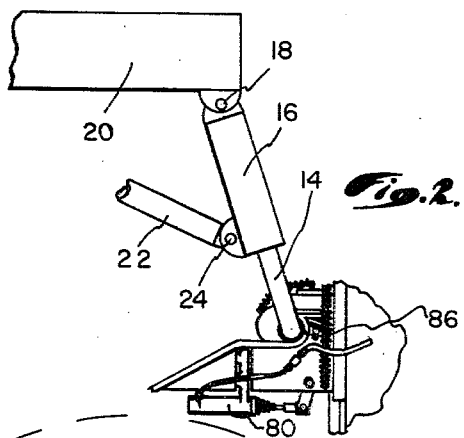
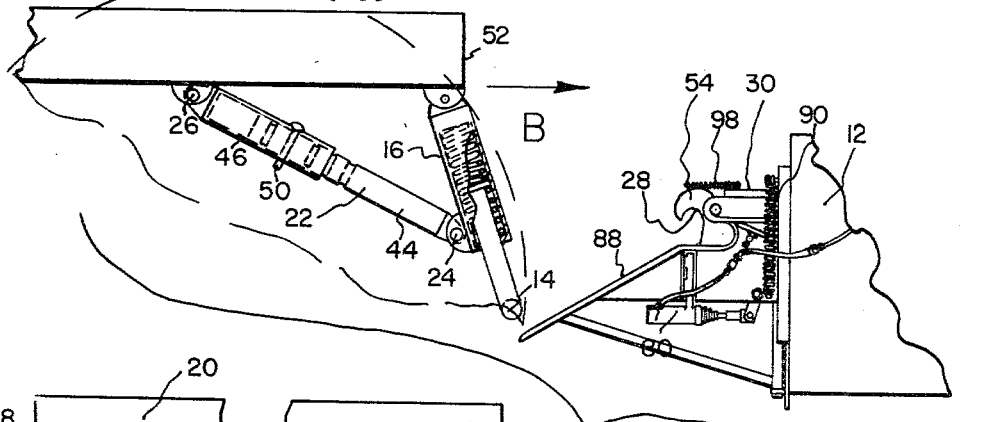
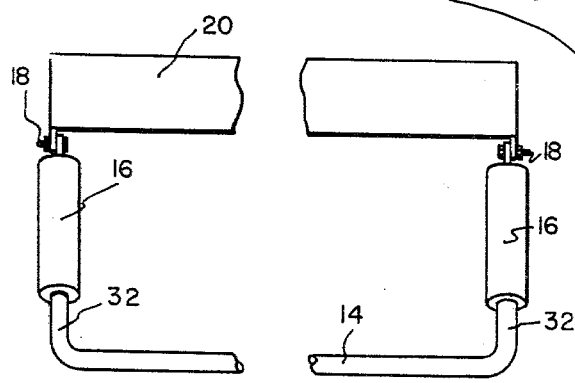
INVENTOR.
RAYMOND E. WEBBER
BY
Wm. H. Dean

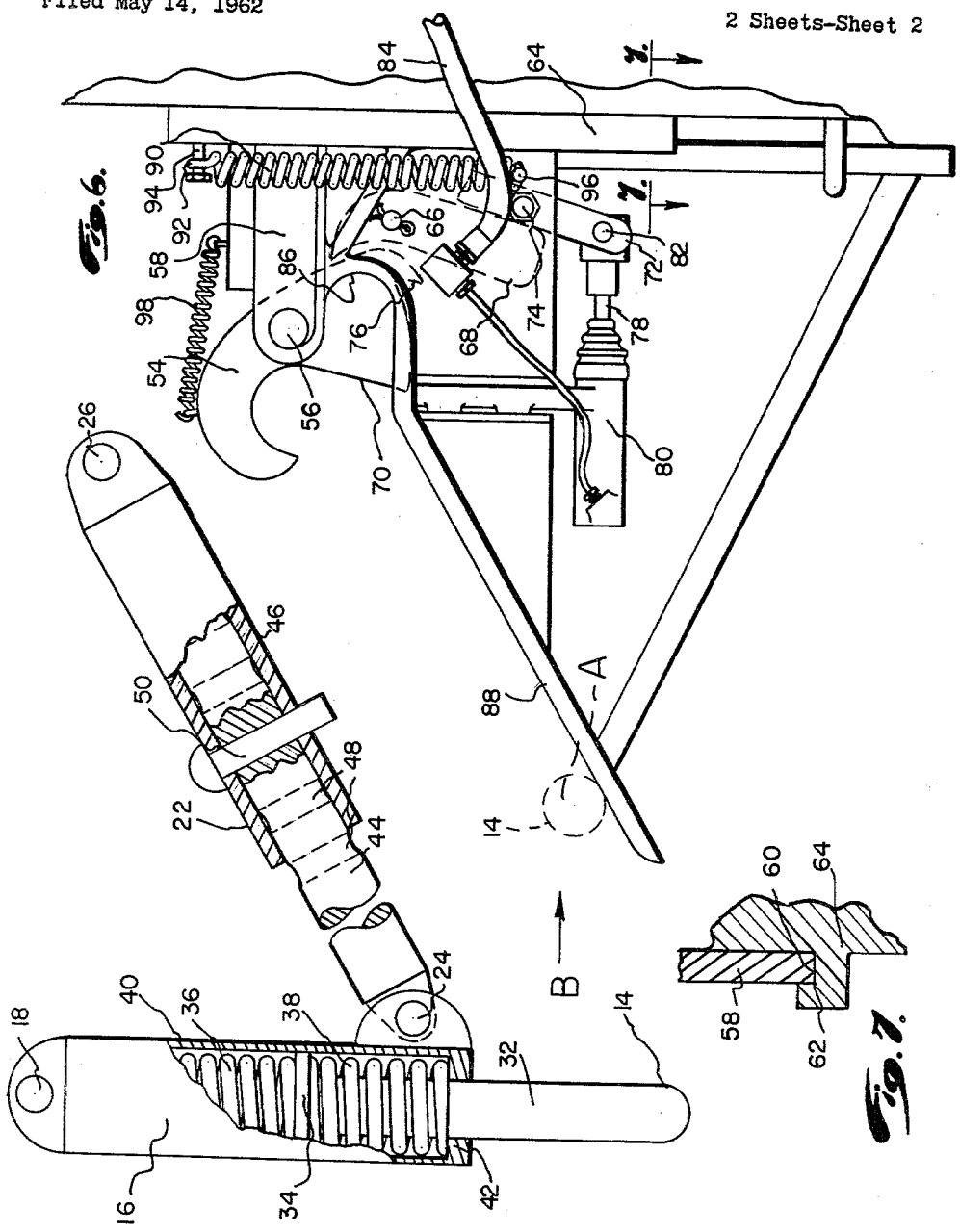

United States Patent Office 3,171,673
Patented Mar. 2, 1965

3,171,673
VARIABLE LEVEL HITCH DEVICE
Raymond E. Webber, 4727 W. Campbell, Phoenix, Ariz.
Filed May 14, 1962, Ser. No. 194,444
4 Claims. (Cl. 280—477)

This invention relates to a variable level hitch device and more particularly to a variable level hitch device for automatically coupling a towing vehicle and a vehicle to be towed, even though the hitch level of one of the vehicles may vary, depending upon the load thereon.

In the coupling of dump trucks and paving machines, it has been a problem automatically to couple the dump truck to the conventional paving machine for towing the paving machine while dumping material thereinto.

The hitch coupling of dump trucks to paving machines has posed a particularly difficult problem since the load in the truck may vary and consequently the deflection of its springs may vary and this causes a variation in the elevation of the hitch bar on the truck with respect to a fixed elevation of a complemental hitch structure on a paving machine.

Accordingly, it is an object of the invention to provide a variable level hitch device which is adapted automatically to couple a pair of vehicles together, even though the elevation of one of the vehicles may vary with respect to the hitch structures of the other vehicle.

Another object of the invention is to provide a novel variable level hitch device and mechanism for coupling dump trucks and paving machines.

Another object of the invention is to provide a novel variable level hitch device adapted automatically to couple dump trucks and paving machines in very closely coupled relationship which has heretofore been unsolved without considerable manual effort and time.

Another object of the invention is to provide a variable level hitch device having hitch mechanism on a paving machine and hitch mechanism on a dump truck, both of which are automatically variable with respect to the machines and their elevations, whereby variable loading of the dump truck does not prevent the hitch structures from automatically engaging and locking so that the truck may tow the paving machine.

Further objects and advantages of the present invention will be apparent from the following specification, appended claims and accompanying drawings, in which:

FIG. 1 is a side elevational view of a dump truck and a paving machine, shown coupled together by the variable level hitch device of the present invention;

FIG. 2 is an enlarged fragmentary side elevational view of the variable level hitch mechanisms coupled to fragmentary portions of the truck and the paving machine and lock hitched together;

FIG. 3 is a side elevational view of the variable level hitch device of the present invention showing mechanism thereof coupled to a fragmentary portion of a truck frame and a fragmentary portion of a paving machine and showing the mechanisms secured to the truck and the paving machine disconnected and unhitched and illustrating the hitch bar coupled to the truck at a substantially lower level than a complemental portion of the mechanism of the hitch device which is coupled to the paving machine;

FIG. 4 is a fragmentary rear view of a variable level hitch device structure of the invention coupled to the rear end of a truck frame;

FIG. 5 is an enlarged side elevational view of the mechanism shown in FIG. 4 and showing parts and portions broken away to amplify the illustration;

FIG. 6 is an enlarged side elevational view of the variable level hitch mechanism of the invention coupled to a paving machine; and FIG. 7 is an enlarged fragmentary sectional view taken from the line 7—7 of FIG. 6.

The variable level hitch device of the invention may be used to couple various vehicles under conditions wherein the level of the connecting hitches of the vehicles may vary at the time when it is desired automatically to merely couple the vehicles and their hitch mechanisms together simply by running one vehicle into contact with the other.

In accordance with the invention, it is possible to automatically couple two vehicles together even though one vehicle may be heavily loaded and its hitch structure relatively lower than when the vehicle is unloaded. Further, such automatic coupling of vehicles may be accomplished on uneven ground where one vehicle may approach the other vehicle at a lower or higher level.

As shown in FIG. 1, a typical example of a use of the variable level hitch device of the invention involves a dump truck 10 and a paving machine 12. While the dump truck 10 is utilized to dump the material into the paving machine, the load in the dump truck may vary and consequently the vertical disposition of its hitch structure may vary due to varying deflection of the truck's springs in accordance with various loads. Thus, hitch structures normally utilized for automatically coupling vehicles together could not be used to couple the dump truck 10 and paving machine 12 without some elevational adjustment of these hitch structures each time the dump truck backs into contact with the paving machine for the purpose of coupling thereto.

In accordance with the present invention, a variable level hitch device comprises an elongated hitch bar 14 having spring-loaded strut mechanism 16 pivotally connected at 18 to the frame 20 of the truck 10. Additional brace struts 22 are coupled to the struts 16 by means of pivot pins 24 and opposite ends of these struts 22 are coupled to the truck frame 20 by means of pins 26.

As shown in FIG. 4 of the drawings, the bar 14 is laterally elongated relative to the rear end of the truck so that the bar 14 may be engaged in a conventional pintle hook structure 28 of the hitch mechanism 30 coupled to the paving machine 12. Opposite ends 32 of the bar 14 are reciprocally mounted in the struts 16 and as shown in FIG. 5, of the drawings, these opposite ends are provided with a flange 34 oppositely engaged by compression springs 36 and 38 in a hollow tubular housing 40 of each strut 16. The spring 36 is held captive in the normally upper end of the strut 16 while the spring 38 is held captive by a shoulder 42 in the normally lower end of each cylindrical strut 16. Thus, the bar 14 is resiliently mounted and may be deflected upwardly by compression of the springs 36 above the flanges 34.

The struts 22, as shown in FIG. 5 of the drawings, are each composed of a pair of telescopic sections 44 and 46. The telescopic section 46 being a hollow cylindrical section which retains the telescopic section 44 through which a plurality of holes 48 extend. A pin 50 extending through the hollow cylindrical telescopic section 46 may be inserted in any one of the holes 48 of the section 44 so that the angular disposition of the struts 16 may be adjusted and the fore and aft position of the bar 14 may be adjusted with respect to the rear end 52 of the truck frame.

The structure of the variable level hitch device 30 which is connected to the paving machine 12 employs a substantially conventional latch hook 54 pivotally mounted on a pin 56 carried by a frame 58 which comprises a pair of gib portions 60, at opposite sides thereof, which are slidable in gibways 62 in a front portion 64 of the paving machine 12.

It will be appreciated that the gibways 62 may be formed in a separate plate to be secured to the paving machine or may be formed in the structure of the paving machine or other vehicle, if desired.

The latch hook 54 is a substantially conventional hook similar to the well known pintle hook and pivoted on a pin 66 in the frame 58 is a conventional spring-loaded latch 68 adapted to lock the latch hook 54 in place after the bar 14 has engaged a portion 70 of the latch hook 54 and forced it into closed position, as shown in FIG. 2 of the drawings.

A release lever 72 is pivotally mounted in the frame 58 by means of a pin 74 and is disposed pivotally to move the latch bar 68 out of latching engagement with a conventional sear 76 on the latch hook 54 when it is desired to release the hook 54 from the bar 14, as will be hereinafter described.

A plunger 78 of a hydraulic cylinder 80 is pivotally coupled to the lever 72 by means of a pin 82 so that fluid pressure induced through a conduit 84 into the cylinder 80 may actuate the plunger 78 to pivot the lever 72 about the axis of the pin 74 to force the latch 68 to pivot about the axis of the pin 66 and release the hook 54 to thereby permit it to move to open position, as shown in FIG. 6 of the drawings. Thus, an operator on the paving machine 12 may operate a hydraulic valve or manual plunger in order to induce hydraulic pressure to release the hook 54 from the bar 14, as will be hereinafter described in detail.

Extending from a position below the pivot pin on which the hook 54 is disposed is a bar socket area 86 in which the bar 14 may nest when the hook 54 is in closed position, a shown in FIG. 2 of the drawings.

Extending downwardly from this bar receiving portion 86 is an inclined ramp 88 which is disposed to be engaged by the bar 14 for vertically adjusting the hitch structures on the truck and the paving machine, as will be hereinafter described. The frame 58 being vertically slidable with respect to the frame 64 stationarily mounted on the paving machine 12, is supported in vertical position by means of springs 90. An upper end 92 of each spring 90 is supported by a bolt 94 stationarily mounted on the frame structure 64 and the lower end of each spring 90 is secured to a pin 96 on the vertically movable frame 58. Thus, as the hitch bar 14, at its broken line position A, shown in FIG. 6 of the drawings, engages the ramp 88 and when the truck 10 moves in the direction of the arrow B, the hitch bar 14 tends to move upwardly and cause compression of the springs 36 above the flanges 34 and also the structure of the frame 58 at its slideway gibs 60, tends to slide downwardly in the gibs 62 against tension of the springs 90 in order to seek a level at which the bar 14 will be engaged with the hook 54 in the bar receiving area 86. Thus, the frame 58 moves downwardly and the bar 14 moves upwardly and as the truck moves backwardly in the direction of the arrow B, as shown in FIG. 3 of the drawings, the bar 14 moves up and the ramp 88 moves down until the bar is latched by the hook 54, whereupon the paving machine 12 is securely hitched to the truck 10.

Due to the elongated structure of the bar 14, the driver of the truck does not need to align the truck precisely with the paving machine 12 from a lateral direction and due to the fact that the hitch structures on both vehicles are vertically movable to seek a level at which they engage, loading of the truck or the contour of the ground is not critical. The hitches will automatically seek a level at which they latch together for securing the vehicles one in towing relationship with the other.

When it is desired to release the bar 14 from the hook 54, an operator on the paving machine 12 initiates operation of the hydraulic cylinder 80, as hereinbefore described, whereupon the plunger 78, lever 72, latch 68 and hook 54 are released whereby a tension spring 98 tends to hold the latch hook 54 in open position until it is again engaged at its portion 70 and forced into closed position by the bar 14.

It will be obvious to those skilled in the art that various modifications of the present invention may be resorted to in a manner limited only by a just intepretation of the following claims:

I claim:

1. In a variable level hitch device the combination of: first and second vehicles; first and second hitch structures on said first and second vehicles, respectively; a bar on one of said structures; an inclined ramp on the other of said structures; and means permitting vertical movement of the other of said hitch structures in response to the engagement of said bar with said ramp; said bar elongated laterally of its respective vehicle; opposite end portions of said bar extending upwardly; flanges on said end portions; a hollow cylindrical member in which said flanges are disposed; and springs surrounding each of said end portions and engaging opposite sides of said flange and disposed to maintain said bar in an elevated position whereby force exerted vertically on said bar causes deflection of said springs to permit said bar to seek a vertical disposition relative to said ramp.

2. In a variable level hitch device the combination of: first and second vehicles; first and second hitch structures on said first and second vehicles, respectively; a bar on one of said structures; an inclined ramp on the other of said structures; and means permitting vertical movement of said bar in response to the engagement of said bar with said ramp; said bar elongated laterally of its respective vehicle; opposite end portions of said bar extending upwardly; flanges on said end portions; a hollow cylindrical member in which said flanges are disposed; and springs surrounding each of said end portions and engaging opposite sides of said flanges and disposed to maintain said bar in an elevated position whereby force exerted vertically on said bar causes deflection of said springs to permit said bar to seek a vertical disposition relative to said ramp; a frame for said ramp; a latch hook pivotally mounted on said frame and disposed to engage said bar when it traverses said ramp; and vertically sliding mechanisms supporting said frame and permitting it together with said ramp and said latch hook to slide vertically in response to engagement of said bar with said ramp.

3. In a variable level hitch device the combination of: first and second vehicles; first and second hitch structures on said first and second vehicles, respectively; a bar on one of said structures; an inclined ramp on the other of said structures; and means permitting vertical movement of said bar in response to the engagement of said bar with said ramp; said bar elongated laterally of its respective vehicle; opposite end portions of said bar extending upwardly; flanges on said end portions; a hollow cylindrical member in which said flanges are disposed; and springs surrounding each of said end portions and engaging opposite sides of said flanges and disposed to maintain said bar in an elevated position whereby force exerted vertically on said bar causes deflection of said springs to permit said bar to seek a vertical disposition relative to said ramp; a frame for said ramp; a latch hook pivotally mounted on said frame and disposed to engage said bar when it traverses said ramp; and vertically sliding mechanisms supporting said frame and permitting it together with said ramp and said latch hook to slide vertically in response to engagement of said bar with said ramp; resilient means tending to support said frame at a predetermined vertical level.

4. In a variable level hitch device the combination of: first and second vehicles; first and second hitch structures on said first and second vehicles, respectively; a bar on one of said structures; an inclined ramp on the other of said structures; and means permitting vertical movement of said bar in response to the engagement of said bar with said ramp; said bar elongated laterally of its respective vehicle; opposite end portions of said bar extending upwardly; flanges on said end portions; a hollow cylindrical member in which said flanges are disposed; and springs surrounding each of said end portions and engaging opposite sides of said flanges and disposed to maintain said bar in an elevated position whereby force exerted vertically on said bar causes deflection of said springs to permit said bar to seek a vertical disposition relative to said ramp; a frame for said ramp; a latch hook pivotally mounted on said frame and disposed to engage said bar when it traverses said ramp; and vertically sliding mechanisms supporting said frame and permitting it together with said ramp and said latch hook to slide vertically in response to engagement of said bar with said ramp; resilient means tending to support said frame at a predetermined vertical level; a hydraulic cylinder; a plunger therefor; a lever coupled to said plunger; latch means associated with said latch bar for holding it closed; said lever disposed to trip said latch means for releasing said latch hook; and means remotely connected to said hydraulic cylinder for operating the same from one of said vehicles.

References Cited by the Examiner
UNITED STATES PATENTS

| | | | |
|---|---|---|---|
| 1,319,224 | 10/19 | Keesler et al. | 280—489 |
| 2,150,269 | 3/39 | Dreisbach | 280—489 X |
| 2,486,605 | 11/49 | Ladd | 280—489 |
| 2,904,348 | 9/59 | Quastad | 280—477 |

A. HARRY LEVY, *Primary Examiner.*